United States Patent
Kim et al.

(10) Patent No.: US 9,753,329 B2
(45) Date of Patent: Sep. 5, 2017

(54) LIQUID CRYSTAL DISPLAY APPARATUS

(71) Applicant: Samsung Display Co., Ltd., Yongin (KR)

(72) Inventors: Ji-Hoon Kim, Hwaseong-si (KR);
Daewon Kim, Suwon-si (KR);
Seungbeom Park, Hwaseong-si (KR);
Seunghee Lee, Hwaseong-si (KR); Yun Jang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 218 days.

(21) Appl. No.: 14/303,248

(22) Filed: Jun. 12, 2014

(65) Prior Publication Data

US 2015/0168762 A1    Jun. 18, 2015

(30) Foreign Application Priority Data

Dec. 18, 2013 (KR) ............. 10-2013-0158437

(51) Int. Cl.
*G02F 1/1335* (2006.01)
*G02F 1/13363* (2006.01)

(52) U.S. Cl.
CPC .... *G02F 1/133634* (2013.01); *G02F 2413/02* (2013.01); *G02F 2413/07* (2013.01); *G02F 2413/14* (2013.01)

(58) Field of Classification Search
CPC ........... G02F 1/13363; G02F 1/133634; G02F 2413/02; G02F 2413/14; G02F 2413/07
USPC ........................................... 349/119
See application file for complete search history.

(56) References Cited

U.S. PATENT DOCUMENTS

| | | | |
|---|---|---|---|
| 7,658,864 B2 | 2/2010 | Yoshikawa et al. | |
| 2005/0057704 A1* | 3/2005 | Ootake | G02F 1/133555 349/69 |
| 2006/0203162 A1 | 9/2006 | Ito et al. | |
| 2009/0059134 A1* | 3/2009 | Ishikawa | G02F 1/134363 349/96 |
| 2010/0134448 A1* | 6/2010 | Park | G02F 1/13338 345/176 |
| 2011/0096259 A1* | 4/2011 | Lee | G02B 5/201 349/41 |

(Continued)

FOREIGN PATENT DOCUMENTS

| | | |
|---|---|---|
| KR | 1020060099468 | 12/2007 |
| KR | 1020070069090 | 6/2008 |

(Continued)

*Primary Examiner* — Nathanael R Briggs
*Assistant Examiner* — William Peterson
(74) *Attorney, Agent, or Firm* — H.C. Park & Associates, PLC

(57) ABSTRACT

A liquid crystal display apparatus includes a liquid crystal display panel including an array substrate, an opposite substrate and a liquid crystal layer, a first polarizing plate disposed on an outer surface of the array substrate and including a first transmission axis, a second polarizing plate disposed on an outer surface of the opposite substrate and including a second transmission axis, a phase difference film disposed between the second polarizing plate and the liquid crystal layer, and a backlight unit providing light to the first polarizing plate. The phase difference film has an in-plane retardation value of about 120 nm to about 150 nm and a thickness retardation value of about 240 nm to about 300 nm.

16 Claims, 9 Drawing Sheets

(56) References Cited

U.S. PATENT DOCUMENTS

| | | | | |
|---|---|---|---|---|
| 2011/0268895 | A1* | 11/2011 | Jung | G02B 5/3083 |
| | | | | 428/1.3 |
| 2012/0003400 | A1* | 1/2012 | Nishimura | B32B 27/08 |
| | | | | 428/1.1 |

FOREIGN PATENT DOCUMENTS

| | | |
|---|---|---|
| KR | 1020100084306 | 1/2010 |
| KR | 1020100058195 | 6/2010 |
| KR | 1020120123840 | 11/2012 |
| KR | 1020130110915 | 10/2013 |
| KR | 10-2015-0010042 | 1/2015 |

\* cited by examiner

LIQUID CRYSTAL DISPLAY APPARATUS

CROSS-REFERENCE TO RELATED APPLICATION

This U.S. non-provisional patent application claims priority under 35 U.S.C. §119 to Korean Patent Application No. 10-2013-0158437, filed on Dec. 18, 2013, the disclosure of which is hereby incorporated by reference for all purposes as if fully set forth herein.

BACKGROUND

Field

The inventive concepts relate to a display apparatus. More particularly, the inventive concepts relate to a liquid crystal display apparatus.

Discussion of the Background

A liquid crystal display apparatus includes two substrates and a liquid crystal material disposed between the two substrates. The intensity of an electric field applied to the liquid crystal material is controlled to regulate the amount of light passing through the two substrates, so that the liquid crystal display apparatus displays a desired image.

A vertical alignment (VA) mode is one of operating modes of the liquid crystal display apparatus. The liquid crystal display apparatus driven in the VA mode includes liquid crystal molecules that are homeotropically aligned with the two substrates and have a negative dielectric constant. If the image is shown in front of the liquid crystal display apparatus driven in the VA mode, the liquid crystal display apparatus has an excellent contrast ratio.

SUMMARY

Embodiments of the inventive concepts may provide a liquid crystal display apparatus with an improved contrast ratio.

Additional features of the invention will be set forth in the description which follows, and in part will be apparent from the description, or may be learned by practice of the invention.

According to some embodiments of the inventive concepts, a liquid crystal display apparatus includes: a liquid crystal display panel including an array substrate having a thin film transistor, an opposite substrate facing the array substrate, and a liquid crystal layer disposed between the array substrate and the opposite substrate, the liquid crystal layer including homeotropically aligned liquid crystal molecules; a first polarizing plate disposed on an outer surface of the array substrate, the first polarizing plate including a first transmission axis; a second polarizing plate disposed on an outer surface of the opposite substrate, the second polarizing plate including a second transmission axis perpendicular to the first transmission axis; a phase difference film disposed between the second polarizing plate and the liquid crystal layer, the phase difference film having an in-plane retardation value of about 120 nm to about 150 nm and a thickness retardation value of about 240 nm to about 300 nm; and a backlight unit providing light to the first polarizing plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EXEMPLARY EMBODIMENTS

Figure 1:
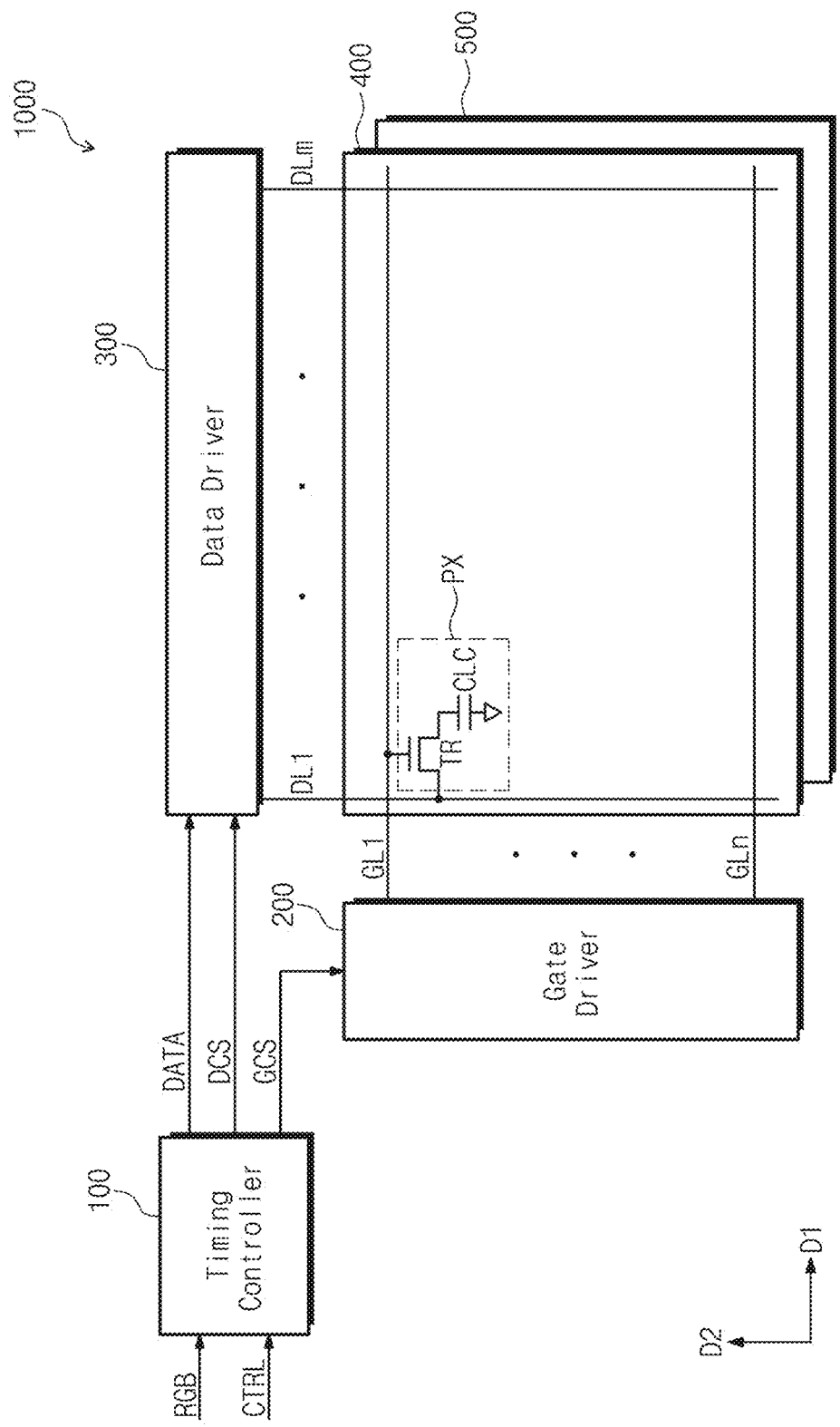
FIG. 1 is a schematic block diagram illustrating a liquid crystal display apparatus according to some embodiments of the inventive concepts.

The inventive concepts will now be described more fully hereinafter with reference to the accompanying drawings, in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein and are exaggerated for clarity.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a schematic block diagram illustrating a liquid crystal display apparatus according to some embodiments of the inventive concepts. Referring to FIG. 1, a liquid crystal display apparatus 1000 according to some embodiments includes a liquid crystal display panel 400 displaying an image, a gate driver 200, a data driver 300, and a timing controller 100. The gate driver 200 and the data driver 300 drive the liquid crystal display panel 400, and the timing controller 100 controls driving of the gate driver 200 and the data driver 300.

The timing controller 100 receives image information RGB and a plurality of control signals CTRL from the outside of the liquid crystal display apparatus 1000. The timing controller 100 converts a data format of the image information RGB into image data DATA suitable to interface specifications of the data driver 300. The timing controller 110 provides the image data DATA to the data driver 300. Additionally, the timing controller 100 generates data control signals DCS (e.g., a output start signal and a horizontal start signal) and gate control signals GCS (e.g., a vertical start signal, a vertical clock signal, and a vertical clock-bar signal), based on the plurality of control signals CTRL. The data control signals DCS are provided to the data driver 300, and the gate control signals GCS are provided to the gate driver 200.

The gate driver 200 sequentially outputs gate signals in response to the gate control signals GCS provided from the timing controller 100. The data driver 300 converts the image data DATA into data voltages in response to the data control signals DCS provided from the timing controller 100, and the data driver 300 outputs the image data DATA to the liquid crystal display panel 400.

The liquid crystal display panel 400 includes a plurality of gate lines GL1 to GLn, a plurality of data lines DL1 to DLm, and a plurality of pixels PX. The gate lines GL1 to GLn extend in parallel along a first direction D1 and are arranged in a second direction D2 perpendicular to the first direction D1. The gate lines GL1 to GLn are connected to the gate driver 200 to receive the gate signals from the gate driver 200.

The data lines DL1 to DLm extend in parallel along the second direction D2 and are arranged in the first direction D1. The data lines DL1 to DLm are connected to the data driver 300 to receive the data voltages from the data driver 300.

Each of the pixels PX includes a thin film transistor TR and a liquid crystal capacitor CLC. Each of the pixels PX may be connected to a corresponding one of the gate lines GL1 to GLn and a corresponding one of the data lines DL1 to DLm. In more detail, the pixel PX is turned-on by a corresponding gate signal, and the turned-on pixel PX displays an image having gradation corresponding to the data voltage.

As illustrated in FIG. 1, the liquid crystal display apparatus 1000 further includes a backlight unit 500 disposed at the back of the liquid crystal display panel 400. The backlight unit 500 generates light and supplies the light to the liquid crystal display panel 400.

In some embodiments, the backlight unit 500 may use a plurality of light emitting diodes as a light source. In this case, the light emitting diodes may be arranged in a stripe form along one direction, or in a matrix form on a printed circuit board.

Figure 2:
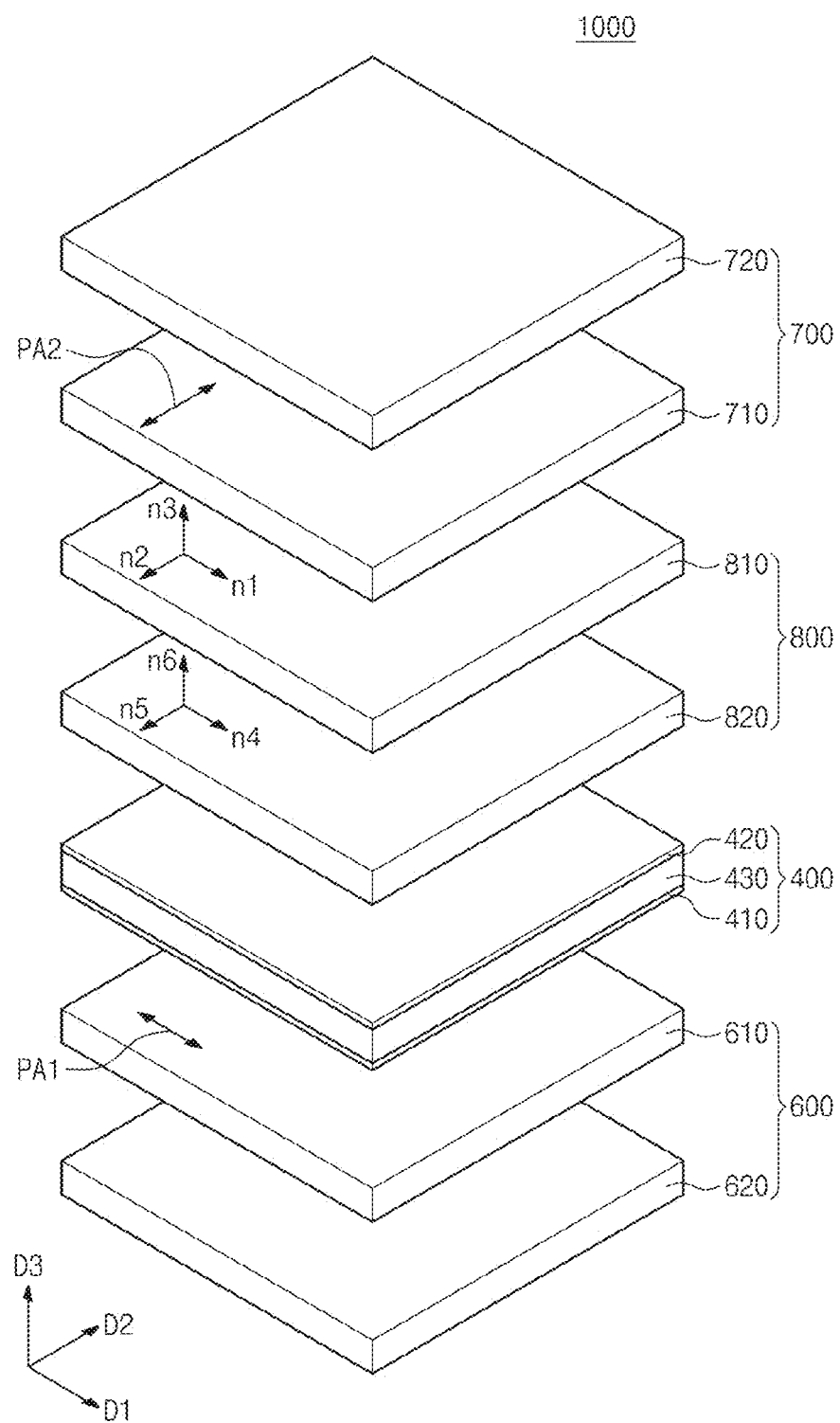
FIG. 2 is an exploded perspective view illustrating the liquid crystal display apparatus of FIG. 1.

FIG. 2 is an exploded perspective view illustrating the liquid crystal display apparatus of FIG. 1. Referring to FIG. 2, the liquid crystal display apparatus 1000 further includes a first polarizing plate 600, a second polarizing plate 700, and a phase difference film 800.

The first polarizing plate 600, the liquid crystal display panel 400, the phase difference film 800, and the second polarizing plate 700 are sequentially stacked along a third direction D3 perpendicular to the first and second directions D1 and D2. In other words, the first polarizing plate 600 is disposed under the liquid crystal display panel 400, and the phase difference film 800 is disposed on the liquid crystal display panel 400. The second polarizing plate 700 is disposed on the phase difference film 800.

The liquid crystal display panel 400 includes an array substrate 410, an opposite substrate 420 opposite to the array substrate 410, and a liquid crystal layer 430 disposed between the array substrate 410 and the opposite substrate 420. The array substrate 410 and the opposite substrate 420 may be formed of a glass or plastic having a high light transmissivity.

The first polarizing plate 600 includes a first polarizing layer 610 and a zero retarder 620. The first polarizing plate 600 has a transmission axis PA1 parallel to the first direction D1 and a first absorption axis parallel to the second direction D2. The first absorption axis is perpendicular to the first transmission axis PA1. Thus, a light component parallel to the second direction D2 of components of light incident on the first polarizing layer 610 may be absorbed to or reflected from the absorption axis, so as not to pass through the first polarizing layer 610. On the contrary, a light component parallel to the first direction D1 of the light incident passes through the first polarizing layer 610.

Here, the incident light may be non-polarized light. The non-polarized light means light including linearly polarized components in all directions and circularly polarized components. The circularly polarized components include a left-circularly polarized component and a right-circularly polarized component.

The first polarizing layer 610 may be formed of a polymer resin oriented in a specific direction. The polymer resin may be a polyvinyl alcohol resin. The polyvinyl alcohol resin is obtained by saponifying a polyvinyl acetate resin. The polyvinyl acetate resin is a homopolymer of vinyl acetate, or a copolymer of the vinyl acetate and a monomer capable of being copolymerized with the vinyl acetate. For example, the monomer capable of being copolymerized with the vinyl acetate may be an unsaturated carboxylic acid, an olefin, a vinyl ether, or an unsaturated sulfonic acid.

The zero retarder 620 is disposed under the first polarizing layer 610. The zero retarder 620 is formed of a material that does not cause phase retardation of light passing through the zero retarder 620. An in-plane retardation value and a thickness retardation value of the zero retarder 620 are substantially zero (0). Thus, a phase of the light passing through the zero retarder 620 is not retarded. The zero retarder 620 may support the first polarizing layer 610. Additionally, the zero retarder 620 may prevent contamination and damage due to external impacts.

The second polarizing plate 700 includes a second polarizing layer 710 and a supporting member 720. The second polarizing layer 710 has a second transmission axis PA2 parallel to the second direction D2, and a second absorption axis parallel to the first direction D1. The second absorption axis is perpendicular to the second transmission axis PA2. Thus, a light component parallel to the first direction D1 of light incident on the second polarizing layer 710 may be absorbed to or reflected from the absorption axis, so as not to pass through the second polarizing layer 710. A light component parallel to the second direction D2 passes through the second polarizing layer 710.

The second polarizing layer 710 may be formed of the same material as the first polarizing layer 610. The supporting member 720 is disposed on a top surface of the second polarizing layer 710. The supporting member 720 is disposed on an entire top surface of the second polarizing layer 710 to support the second polarizing plate 700. For example, the supporting member 720 may include a cellulose-based polymer such as triacetate cellulose (TAC).

The phase difference film 800 has optical anisotropy. The phase difference film 800 is an optical element that changes polarization of light passing through the phase different film 800 by the optical anisotropy. The phase difference film 800 compensates a phase difference according to a viewing angle, which is caused by optical anisotropy of the liquid crystal layer 430. An effective angle between the first and second transmission axes PA1 and PA2 is varied depending on the viewing angle. The phase difference film 800 also compensates a viewing angle characteristic according to the varied effective angle. An in-plane retardation value of the phase difference film 800 is in a range of about 120 nm to about 150, and a thickness retardation value of the phase difference film 800 is in a range of about 240 nm to about 300 nm.

The phase difference film 800 includes an A-plate 810 and a negative C-plate 820. The A-plate 810 may be disposed between the negative C-plate 820 and the second polarizing plate 700. However, positions of the A-plate 810 and the negative C-plate 820 may be changed. For example, in other embodiments, the negative C-plate 820 may be disposed between the A-plate 810 and the second polarizing plate 700.

A refractive index in the first direction D1 of the A-plate 810 is defined as a first refractive index n1, and a refractive index in the second direction D2 of the A-plate 810 is defined as a second refractive index n2. A refractive index in the third direction D3 of the A-plate 810 is defined as a third refractive index n3. The first to third refractive indexes n1, n2, and n3 satisfy the following Equation 1. Generally, the A-plate 810 satisfying the following Equation 1 is called 'a positive A-plate'.

$$n2 \approx n3 < n1 \quad \text{[Equation 1]}$$

An in-plane retardation value of the A-plate 810 is in a range of about 120 nm to about 150 nm. The second and third refractive indexes n2 and n3 may have a predetermined value that is not zero. The A-plate 810 has a predetermined thickness retardation value. For example, the thickness retardation value of the A-plate 810 may be in a range of about 60 nm to about 75 nm.

The A-plate 810 may be formed of a material having reverse wavelength dispersion. Here, the reverse wavelength dispersion means that a retardation amount of a phase becomes less as a wavelength of light in at least the visible light band becomes shorter.

A refractive index in the first direction D1 of the negative C-plate 820 is defined as a fourth refractive index n4, and a refractive index in the second direction D2 of the negative C-plate 820 is defined as a fifth refractive index n5. A refractive index in the third direction D3 of the negative C-plate 820 is defined as a sixth refractive index n6. The fourth to sixth refractive indexes n4, n5 and n6 satisfy the following Equation 2.

$$n4 \approx n5 > n6 \quad \text{[Equation 2]}$$

A thickness retardation value of the negative C-plate 820 is in a range of about 190 nm to about 210 nm. In some embodiments, the in-plane retardation value of the phase difference film 800 may include the sum of in-plane retardation values of the negative C-plate 820 and the A-plate 810. In some embodiments, the in-plane retardation value of the negative C-plate 820 may be substantially equal to zero. In some embodiments, the thickness retardation value of the phase difference film 800 may include the sum of the thickness retardation values of the negative C-plate 820 and the A-plate 810. For example, the negative C-plate 820 may be formed of a material having reverse wavelength dispersion.

Figure 3:
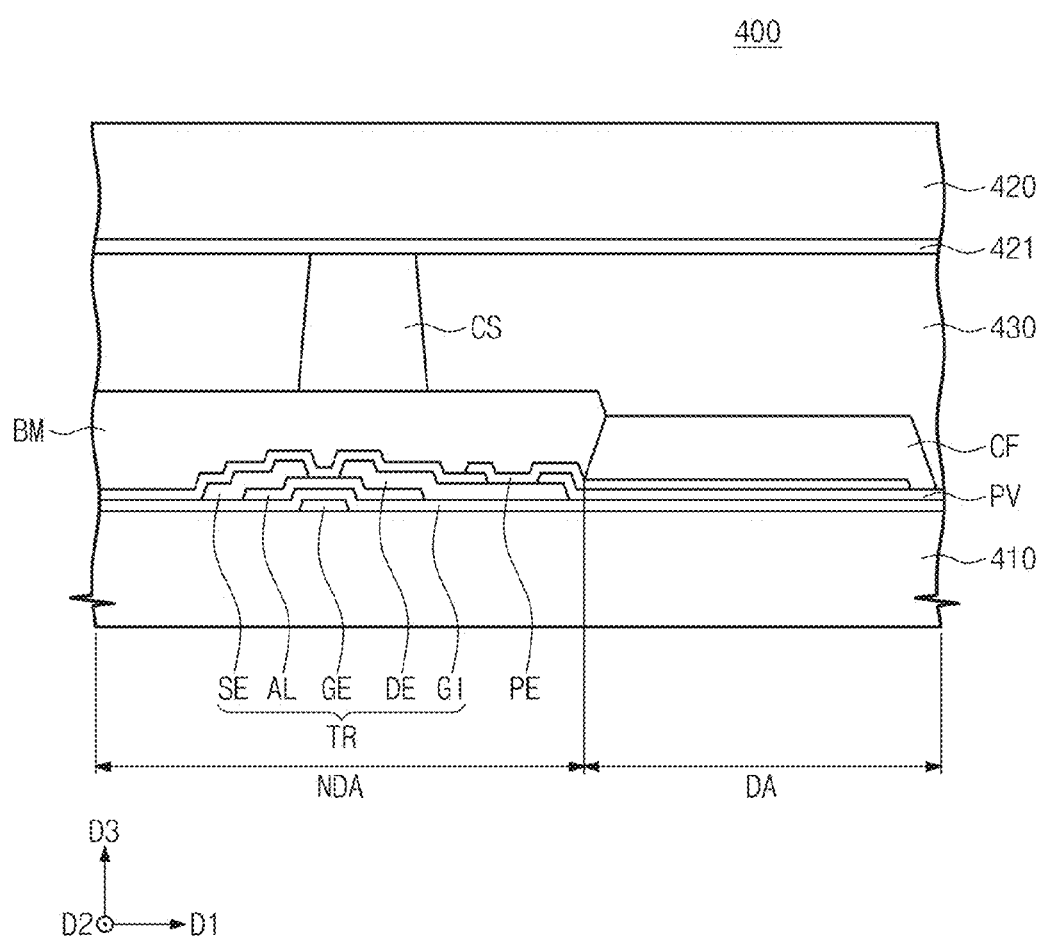
FIG. 3 is a cross-sectional view illustrating a liquid crystal display panel of FIG. 2.

FIG. 3 is a cross-sectional view illustrating a liquid crystal display panel of FIG. 2. Referring to FIG. 3, the liquid crystal display panel 400 includes a thin film transistor TR, a pixel electrode PE, a common electrode 421, a black matrix BM, and a column spacer CS.

The thin film transistor TR includes a gate electrode GE, a gate insulating layer GI, a semiconductor layer AL, a source electrode SE, and a drain electrode DE. The gate electrode DE is disposed on the array substrate 410. The gate insulating layer GI electrically insulates the gate electrode GE from the semiconductor layer AL. The semiconductor layer AL may be disposed on the gate electrode GE with the gate insulating layer GI therebetween. The source electrode SE is in contact with the semiconductor layer AL. The drain electrode DE is spaced apart from the source electrode SE and is in contact with the semiconductor layer AL.

An insulating layer PV is disposed on the thin film transistor TR. The insulating layer PV may be formed of at least one of an inorganic material and an organic material.

The liquid crystal display panel 400 includes a display region DA and anon-display panel NDA. A contact hole is formed in the insulating layer PV. The contact hole exposes the drain electrode DE. The contact hole is formed in the non-display region NDA.

The pixel electrode PE is disposed in the display region DA and the non-display region NDA. The pixel electrode PE is electrically connected to the drain electrode DE through the contact hole. The pixel electrode PE may be formed of, for example, a transparent conductive material such as indium-tin oxide (ITO).

A color filter CF is disposed in the display region DA. For example, the color filter CF covers at least a portion of the thin film transistor TR and at least a portion of the pixel electrode PE. For example, the color filter CF may be any one of a red color filter, a green color filter, and a blue color filter. The black matrix BM is disposed in the non-display region NDA and shields the non-display region NDA from external light. In the present embodiment, the black matrix BM is disposed on the insulating layer PV. The black matrix BM is formed of a material shielding light.

However, in other embodiments, the color filer CF may be disposed between the pixel electrode PE and the insulating layer PV. In this case, a contact hole exposing the drain electrode DE may be formed in the color filter CF, and the pixel electrode PE may be connected to the drain electrode DE through the contact hole formed in the color filter CF. The column spacer CS is disposed between the array substrate 410 and the opposite substrate 420, to maintain a distance between the array substrate 410 and the opposite substrate 420. In the present embodiment, the column spacer CS is disposed on the black matrix BM in the non-display region NDA. The column spacer CS may be formed of a light shielding material.

The common electrode 421 is disposed on the opposite substrate 420. The common electrode 421 receives a common voltage to generate an electric field along with the pixel electrode PE. For example, the common electrode 421 may be formed of a transparent conductive material such as indium-tin oxide (ITO).

The liquid crystal layer 430 controls the intensity of light passing through the liquid crystal display panel 400. The liquid crystal layer 430 includes liquid crystal molecules having dielectric constant anisotropy and optical anisotropy. The liquid crystal molecules have negative dielectric constant anisotropy. Thus, the liquid crystal molecules are rearranged such that long axes of the liquid crystal molecules are perpendicular to the electric field applied to the liquid crystal molecules. The liquid crystal molecules are homeotropically aligned in the third direction D3.

Figure 4:
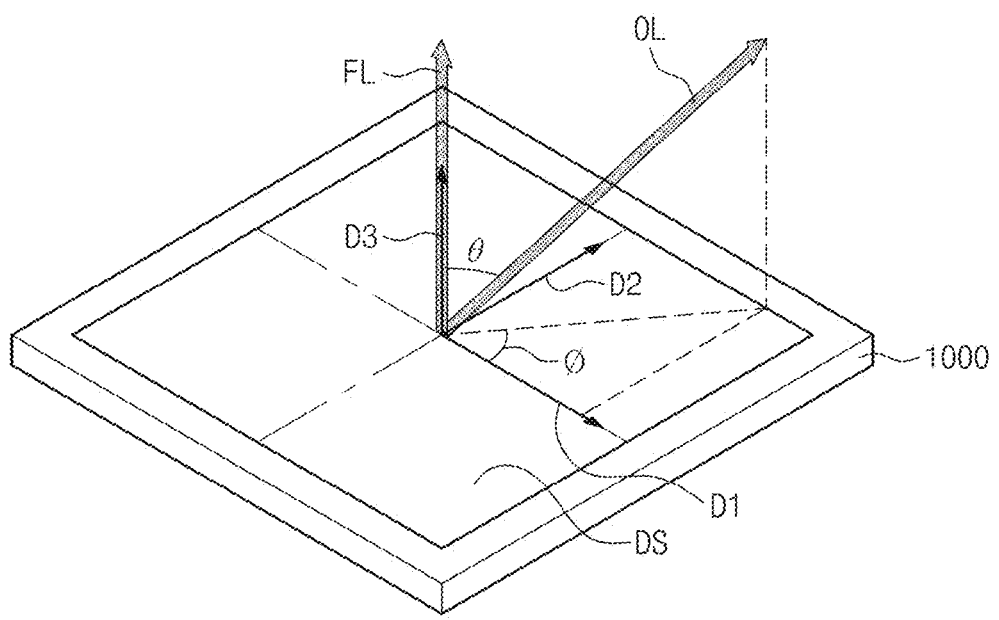
FIG. 4 is a perspective view illustrating front light and side light displayed from a liquid crystal display apparatus.
Figure 5:
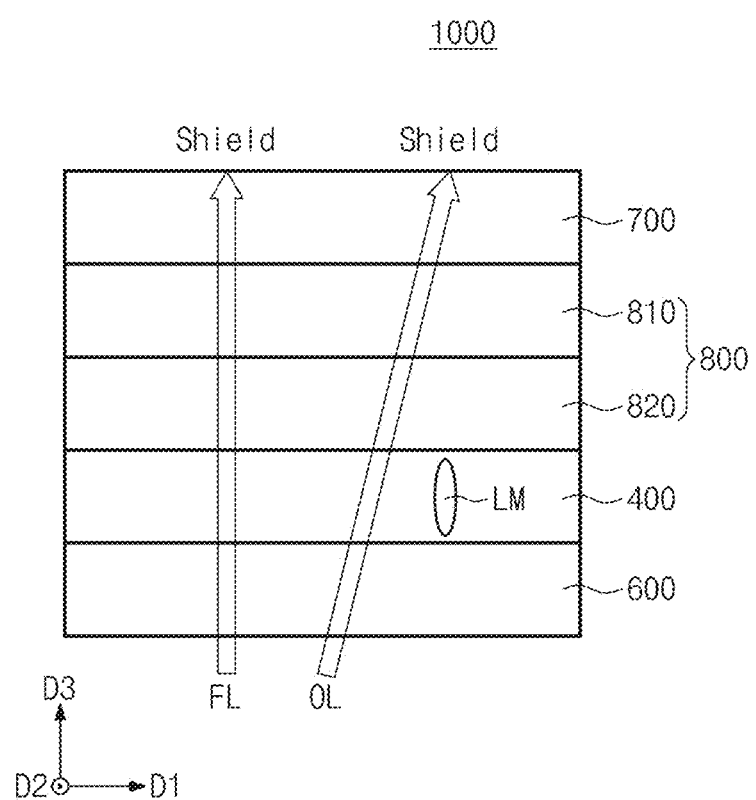
FIG. 5 is a cross-sectional view illustrating the liquid crystal display apparatus of FIG. 4.
Figure 6:
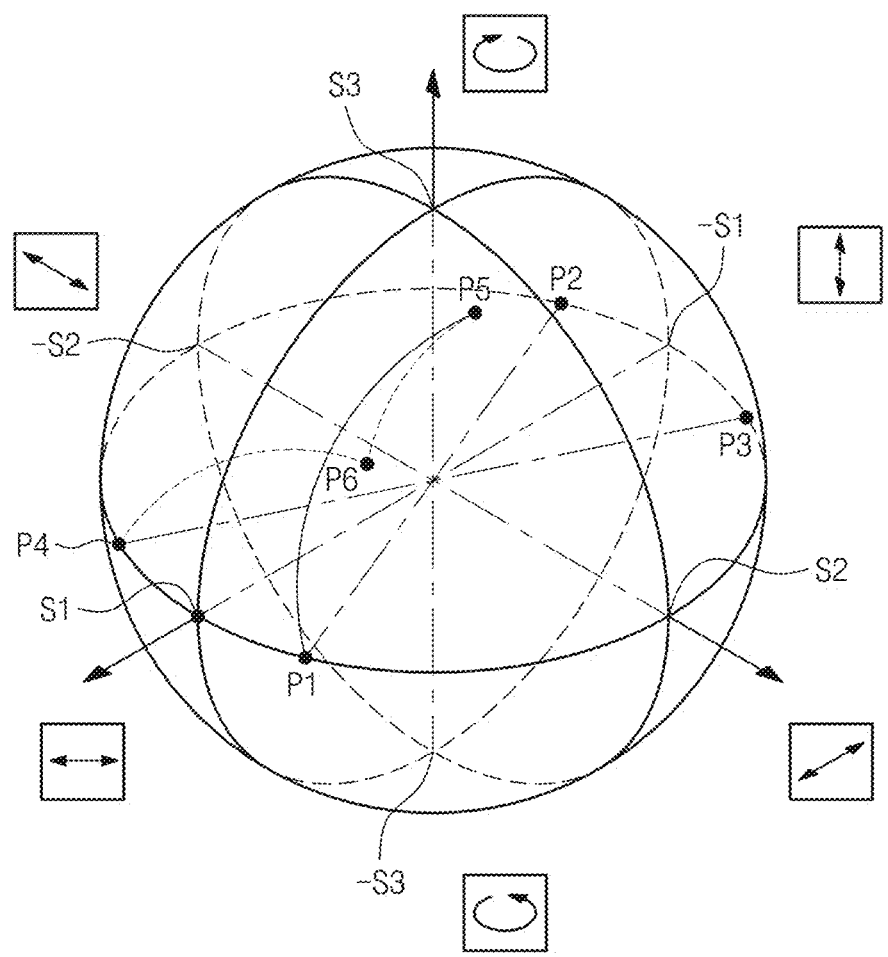
FIG. 6 is a Poincare sphere illustrating variation of polarization states of front light and side light passing through the liquid crystal display apparatus of FIG. 5.

FIG. 4 is a perspective view illustrating front light and side light displayed from a liquid crystal display apparatus. FIG. 5 is a cross-sectional view illustrating the liquid crystal display apparatus of FIG. 4. FIG. 6 is a Poincare sphere illustrating variation of polarization states of front light and side light passing through the liquid crystal display apparatus of FIG. 5.

Referring to FIGS. 4 and 5, the liquid crystal display apparatus 1000 includes a display surface DS. The display surface DS is parallel to a plane defined by the first and second directions D1 and D2. Front light FL and side light OL are emitted through the display surface DS.

A user may view an image in front of the display surface DS by receiving the front light FL. The front light FL travels in parallel to the third direction D3. Additionally, a user may view the image at a side of the display surface DS by the side light OL. The side light OL travels along an optical path inclined with respect to the display surface DS of the liquid crystal display apparatus 1000.

Generally, a certain point may be expressed by an azimuth, an inclination angle, and a distance from the origin, in a three-dimensional spherical coordinate system. Hereinafter, the inclination angle is defined as an angle between the certain point and the third direction with respect to the origin, and the azimuth is defined as an angle between the first direction D1 and the certain point projected in the plane defined by the first and second directions D1 and the D2 with respect to the origin. In the present embodiment, the inclination angle of the optical path of the side light OL has a first angle $\theta$, and the azimuth of the optical path of the side light OL has a second angle $\phi$.

As illustrated in FIG. 5, the liquid crystal display apparatus 1000 is in a dark state in the present embodiment. In this case, long axes of the liquid crystal molecules LM in the liquid crystal layer 430 are arranged in parallel to the third direction D3.

The front light FL and the side light OL sequentially pass through the first polarizing plate 600, the liquid crystal display panel 400, and the phase difference film 800, to reach the second polarizing plate 700. Since the front light FL and the side light OL sequentially pass through the first polarizing plate 600, the liquid crystal display panel 400, the phase difference film 800, and the second polarizing plate 700, polarization states of the front light FL and the side light OL are varied, according to optical characteristics of the first polarizing plate 600, the liquid crystal display panel 400, the phase difference film 800, and the second polarizing plate 700.

Hereinafter, the variation of the polarization states of the front light FL and the side light OL will be described with reference to the Poincare sphere of FIG. 6. All polarization states of light are expressed by points on or in a spherical surface of the Poincare sphere. If an optical axis, a retardation axis, and a retardation value of an optical element are known, a polarization state of light after passing through the optical element may be easily forecasted using the Poincare sphere. Thus, the Poincare sphere is mainly used when a phase difference film is designed.

Points on an equator express linear polarization states in the Poincare sphere. A first pole S1, a first opposite pole −S1, a second pole S2, and a second opposite pole −S2 are disposed on the equator. The first pole S1 expresses a linear polarization state in the first direction D1 of light. The first opposite pole −S1 is disposed at a point opposite to the first pole S1 with respect to the origin. The first opposite pole −S1 expresses a linear polarization state in the second direction D2. The second pole S2 expresses a linear polarization state that is rotated clockwise by +45 degrees from the first direction D1. The second opposite pole −S2 is disposed at a point opposite to the second pole S2 with respect to the origin. The second opposite pole −S2 expresses a linear polarization state that is rotated counterclockwise by −45 degrees from the first direction D1.

An upper hemisphere of the Poincare sphere expresses a right-handed elliptical polarization state, and a lower hemisphere of the Poincare sphere expresses a left-handed elliptical polarization state. A third pole S3 expresses a right-circular polarization state, and a third opposite pole −S3 opposite to the third pole S3 with respect to the origin expresses a left-circular polarization state. As a point is moved from the equator to the third pole S3, a state of light of the point is varied from the linear polarization state to the right-circular polarization state. As a point is moved from the equator to the third opposite pole −S3, a state of light of the point is varied from the linear polarization state to the left-circular polarization state.

If the user views the image in front of the display surface DS through the front light FL, the first transmission axis PA1 parallel to the first direction D1 corresponds to the first pole S1, and the first absorption axis parallel to the second direction D2 corresponds to the first opposite pole −S1. Additionally, the second transmission axis PA2 parallel to the second direction D2 corresponds to the first opposite pole −S1, and the second absorption axis parallel to the first direction D1 is expressed at the first pole S1.

If the polarization state of light reaches the point corresponding to the second absorption axis, the light is absorbed by the second absorption axis and is shielded. Thus, the point corresponding to the second absorption is called 'an extinction point'.

If the front light FL is incident on the first polarizing plate 600, the front light FL is linearly polarized such that the polarization state of the front light FL is located at the first pole S1. Thereafter, even though the front light FL sequentially penetrates the liquid crystal layer 430 and the phase difference film 800, the front light FL passes through an optical axis of the liquid crystal molecules of the liquid crystal layer 430 and an optical axis of the phase difference film 800, such that the phase of the front light FL is not retarded. Thus, the polarization state of the front light FL is not varied and remains at the first pole S1.

Since the first pole S1 corresponds to the second absorption axis of the second polarizing plate 700, the polarization state of the front light FL incident on the second polarizing plate 700 is parallel to the second absorption axis. Thus, the front light FL is absorbed by the second absorption axis. As a result, the front light FL does not pass through the second polarizing plate 700 and is shielded.

If the user views the image from the side of the display surface DS by receiving the side light OL, points corresponding to the first transmission axis PA1 and the first absorption axis of the first polarizing plate 600 are moved along the equator of the Poincare sphere. The point corresponding to the first transmission axis PA1 is moved from the first pole S1 to a first point P1 along the equator. The point corresponding to the first absorption axis is moved from the first opposite pole −S1 to a second point P2 opposite to the first point P1 with respect to the origin.

A point corresponding to the second transmission axis PA2 is moved from the first opposite pole −S1 to a third point P3 along the equator, and a point corresponding to the second absorption axis is moved from the first pole S1 to a fourth point P4 opposite to the third point P3 with respect to the origin.

If the side light OL penetrates the first polarizing plate 600, a polarization state of the side light OL is disposed at the first point P1 in the Poincare sphere. Thereafter, as the side light OL passes through the liquid crystal layer 430, a phase of the side light OL is retarded such that the polarization state of the side light OL is closer to the circular polarization state. At this time, the polarization state of the side light OL is moved from the first point P1 to a fifth point P5 on the Poincare sphere.

Thereafter, as the side light OL penetrates the negative C-plate 820, the phase of the side light OL is retarded, such that the polarization state of the side light OL is closer to the linear polarization state. At this time, the polarization state of the side light OL is moved from the fifth point P5 to a sixth point P6. When the side light OL passes through the A-plate 810, the phase of the side light OL is retarded, and the polarization state of the side light OL is moved from the sixth point P6 to the fourth point P4, i.e., the extinction point.

Since the fourth point P4 corresponds to the second absorption axis of the second polarizing plate 700, the polarization state of the side light OL is parallel to the second absorption axis. Thus, the side light OL is absorbed by the second absorption and does not pass through the second polarizing plate 700.

As described above, when the liquid crystal display apparatus 1000 is in the dark state, the A-plate 810 and the negative C-plate 820 control the polarization state of the side light OL, such that the side light OL is shielded by the second polarizing plate 700. As a result, it is possible to prevent light leakage caused by the side light OL (hereinafter, referred to as 'side light leakage'). Thus, the contrast ratio of the liquid crystal display apparatus 1000 may be improved.

When the side light OL passes through the negative C-plate 820 and the A-plate 810, a path (hereinafter, referred to as 'a polarization path') along which the polarization state of the side light OL reaches the extinction point (i.e., the fourth point P4) is an important factor with regard to inhibiting the side light leakage. The polarization path is determined depending on the retardation values of the negative C-plate 820 and the A-plate 810. Thus, the retardation values of the negative C-plate 820 and the A-plate 810 should be designed to inhibit the side light leakage as much as possible.

According to the aforementioned embodiments of the inventive concepts, the thickness retardation value of the negative C-plate 820 is in the range of about 190 nm to about 210 nm, and the in-plane retardation value of the A-plate 810 is in the range of about 120 nm to about 150 nm. If the polarization state of the side light OL is changed along the polarization path corresponding to the thickness retardation value of the negative C-plate 820 and the in-plane retardation value of the A-plate 810, the contrast ratio is markedly improved, as with be described with reference to FIGS. 7A and 7B.

Additionally, structures (e.g., the thin film transistor TR, the column spacer CS, the black matrix BM and the color filter CF) scattering light inputted from the backlight unit 500 are disposed on the array substrate 410, and the phase difference film 800 changing the polarization of the light is disposed on the opposite substrate 420. Thus, it is possible to inhibit scattering of circularly polarized light, which is caused by such structures. As a result, light leakage caused by scattering of the circularly polarized light is reduced, to further improve the contrast ratio of the liquid crystal display apparatus 1000.

In more detail, there is no element (e.g., a phase difference film) that delays a phase of light linearly polarized in the first direction D1 through the first polarizing plate 600, to change the linear polarization into elliptical or circular polarization between the first polarizing plate 600 and the structures of the liquid crystal display apparatus 1000. Thus, only the light linearly polarized in the first direction D1 reaches the structures, and the circularly polarized light does not reach the structures. As a result, only light leakage by scattering of the light linearly polarized in the first direction D1 occurs, and light leakage by scattering of the circularly polarized light is inhibited.

Generally, the amount of light leakage caused by scattering of circularly polarized light is greater than the amount of light leakage caused by scattering of linearly polarized light. According to embodiments of the inventive concepts, the light leakage caused by scattering of the circularly polarized light is prevented, to improve the contrast ratio of the liquid crystal display apparatus 1000.

Figure 7A:
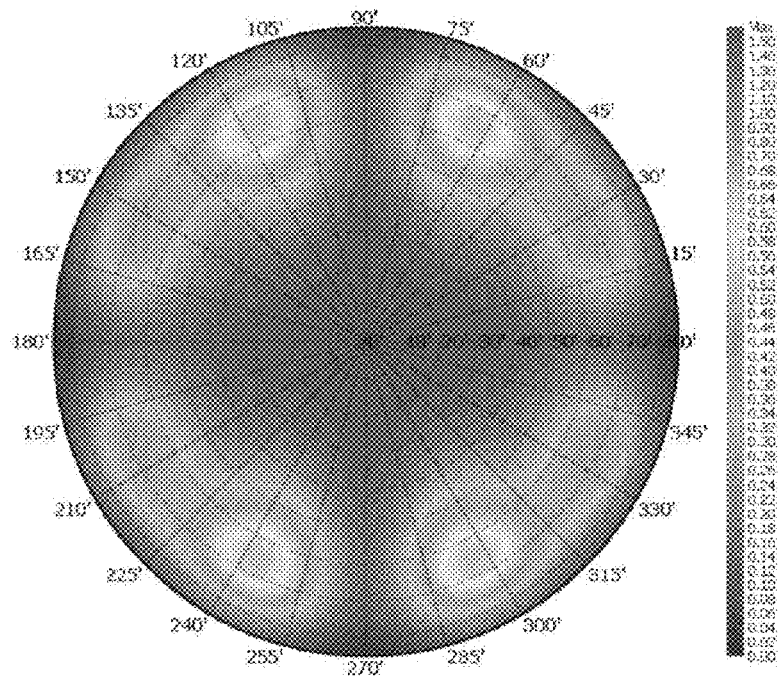
FIG. 7A shows a simulation result of a contrast ratio characteristic of a comparison example.
Figure 7B:
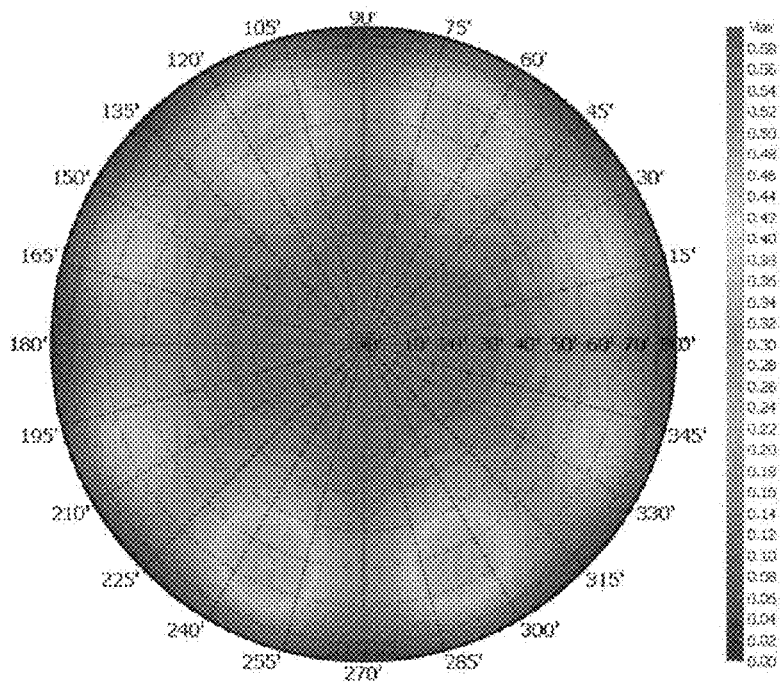
FIG. 7B shows a simulation result of a contrast ratio characteristic of a liquid crystal display apparatus according to various embodiments of the inventive concepts.

FIG. 7A shows a simulation result of a contrast ratio characteristic of a comparison example, and FIG. 7B shows a simulation result of a contrast ratio characteristic of a liquid crystal display apparatus according to a first embodiment of the inventive concepts. FIGS. 7A and 7B are simulation graphs illustrating a contrast ratio characteristic of a liquid crystal display apparatus according to an azimuth. In FIGS. 7A and 7B, a value of each of contour lines expresses the amount of viewed light (i.e., the amount of the side light leakage) when an image is viewed from a liquid crystal display panel at a corresponding azimuth and a corresponding inclination angle. As the value of the contour line becomes lower, the amount of the side light leakage is reduced. Thus, the low values of the contour line mean that a contrast ratio characteristic is excellent. Angles corresponding to concentric circles of FIGS. 7A and 7B mean inclination angles at which the side light leakage is measured. The inclination angle was changed from 0 degree to 90 degrees. In the graphs of FIGS. 7A and 7B, an angle between an axis and a straight line between a certain point and the origin means an azimuth at which the side light leakage is measured. The azimuth was changed from 0 degree to 360 degrees.

FIG. 7A shows a simulation value of a contrast ratio characteristic of the comparison example. The comparison example is a liquid crystal display apparatus applied with a conventional phase difference film that includes one biaxial film having an in-plane retardation value of 65 nm, and a thickness retardation value of 180 nm, and a negative C-plate having a thickness retardation value of 90 nm. According to the contrast ratio characteristics of the comparison example, the amount of side light leakage is small at azimuths of 0 degrees, 90 degrees, 180 degrees, and 270 degrees. On the other hand, the amount of side light leakage is large at an inclination angle of about 65 degrees and azimuths of 65 degrees, 115 degrees, 245 degrees, and 295 degrees. The side light leakage of the comparison example has a first maximum value at the inclination angle of 65 degrees and the azimuth of 65 degrees. The first maximum value is 0.68 cd/m$^2$.

FIG. 7B shows a simulation value of a contrast ratio characteristic of the liquid crystal display apparatus according to a first embodiment of the inventive concepts. The liquid crystal display apparatus according to the first embodiment includes the A-plate having the in-plane retardation value of 130 nm and the negative C-plate having the thickness retardation value of 200 nm. According to the contrast ratio of the liquid crystal display apparatus of the first embodiment, the amount of the side light leakage is small at the azimuths of 0 degrees, 45 degrees, 90 degrees, 135 degrees, 180 degrees, 225 degrees, 270 degrees, and 315 degrees. On the other hand, the amount of the side light leakage is large at the inclination angle of about 65 degrees and the azimuths of 20 degrees, 70 degrees, 160 degrees, 200 degrees, 290 degrees and 340 degrees. The side light leakage of the first embodiment has a second maximum value at the inclination angle of about 65 degrees and the azimuth of 70 degrees. The second maximum value is 0.33 cd/m$_2$.

However, the second maximum value is markedly lower than the first maximum value. The second maximum value markedly decreases by about 51.4%, as compared with the first maximum value. [(0.68−0.33)/0.68=51.4%]

Figure 8:
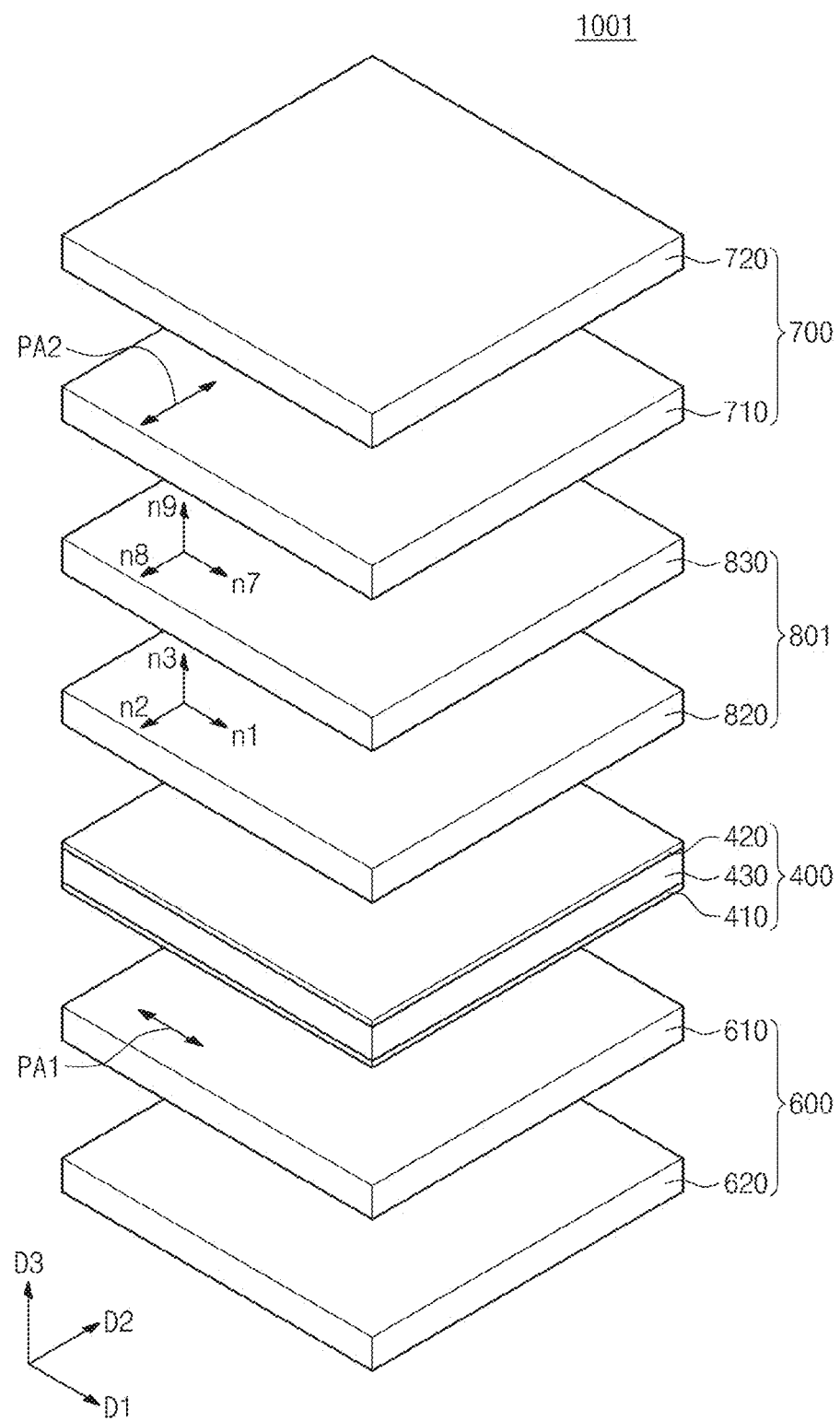
FIG. 8 is an exploded perspective view illustrating a liquid crystal display apparatus according to various embodiments of the inventive concepts.

FIG. 8 is an exploded perspective view illustrating a liquid crystal display apparatus according to other embodiments of the inventive concepts. In the present embodiment, the same elements as described with reference to FIGS. 1 to 6 will be indicated by the same reference numerals or the same reference designators. The descriptions to the same elements as described in FIGS. 1 to 6 will be omitted or mentioned briefly.

A liquid crystal display apparatus 1001 of FIG. 8 substitutes a biaxial film 830 for the A-plate 810 of the liquid crystal display apparatus 1000 of FIGS. 1 to 6. Other elements of the liquid crystal display apparatus 1001 of FIG. 8 may be the same as corresponding elements of the liquid crystal display apparatus 1000 of FIGS. 1 to 6.

Referring to FIG. 8, the liquid crystal display apparatus 1001 includes a phase difference film 801, and the phase difference film 801 includes the biaxial film 830. An in-plane retardation value of the phase difference film 801 is in a range of about 120 nm to about 150, and a thickness retardation value of the phase difference film 801 is in a range of about 240 nm to about 300 nm. In some embodiments, the in-plane retardation value of the phase difference film 801 may include the sum of in-plane retardation values of the negative C-plate 820 and the biaxial film 830. In some embodiments, the thickness retardation value of the phase difference film 801 may include the sum of the thickness retardation values of the negative C-plate 820 and the biaxial film 830.

The biaxial film 830 is disposed between the negative C-plate 820 and the second polarizing layer 710. However, the position of the biaxial film 830 may be changed. In other embodiments, the biaxial film 830 may be disposed between the negative C-plate 820 and the liquid crystal display panel 400, for example.

A refractive index in the first direction D1 of the biaxial film 830 is defined as a seventh refractive index n7, and a refractive index in the second direction D2 of the biaxial film 830 is defined as an eighth refractive index n8. A refractive index in the third direction D3 of the biaxial film 830 is defined as a ninth refractive index n9. The seventh to ninth refractive indexes satisfy the following equation 3.

$n9<n8<n7$     [Equation 3]

An in-plane retardation value of the biaxial film 830 is in a range of about 120 nm to about 150 nm, and a thickness retardation value of the biaxial film 830 is in a range of about 60 nm to about 80 nm. The biaxial film 830 may be formed of, for example, a material having reverse wavelength dispersion.

If a user views an image at a side the liquid crystal display apparatus 1001, variation of a polarization state of light penetrating the liquid crystal display apparatus 1001 may be similar to the variation of the polarization state, which is described with reference to FIG. 6. Thus, if the liquid crystal display apparatus 1001 is in the dark state, the biaxial film 830 and the negative C-plate 820 controls the polarization state of the side light OL such that the side light OL is shielded by the second polarizing plate 700. As a result, the side light leakage caused by the side light OL may be prevented, so that the contrast ratio of the liquid crystal display apparatus 1001 may be improved.

According to embodiments of the inventive concepts, the thickness retardation value of the negative C-plate 820 is in the range of about 190 nm to about 210 nm, the in-plane retardation value of the biaxial film 830 is in the range of about 120 nm to about 150 nm, and the thickness retardation value of the biaxial film 830 is in the range of about 60 nm to about 80 nm. The polarization sate of the side light OL is changed along a polarization path corresponding to the retardation values described above such that the contrast ratio characteristic is markedly improved, as described with reference to FIGS. 9A and 9B later.

Figure 9A:
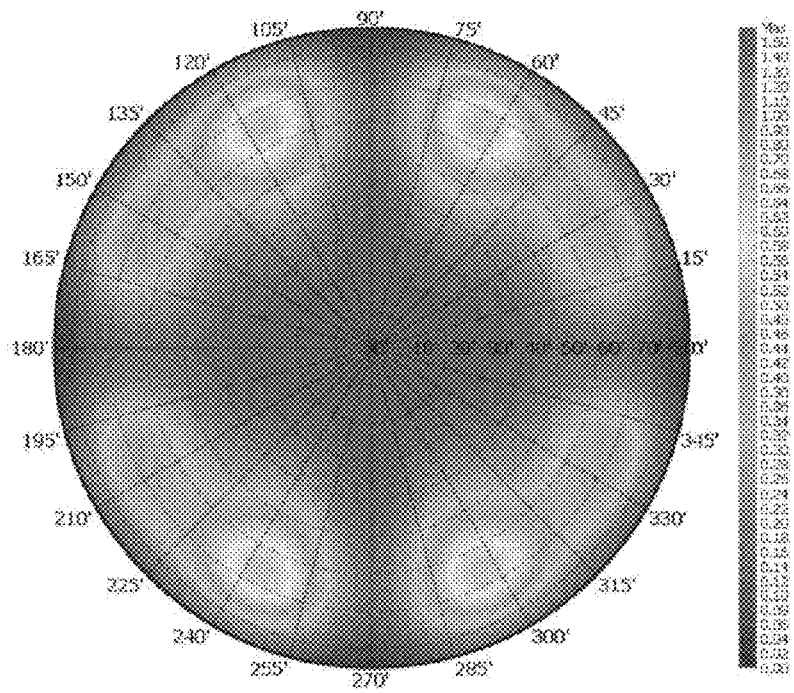
FIG. 9A shows a simulation result of a contrast ratio characteristic of a comparison example.
Figure 9B:
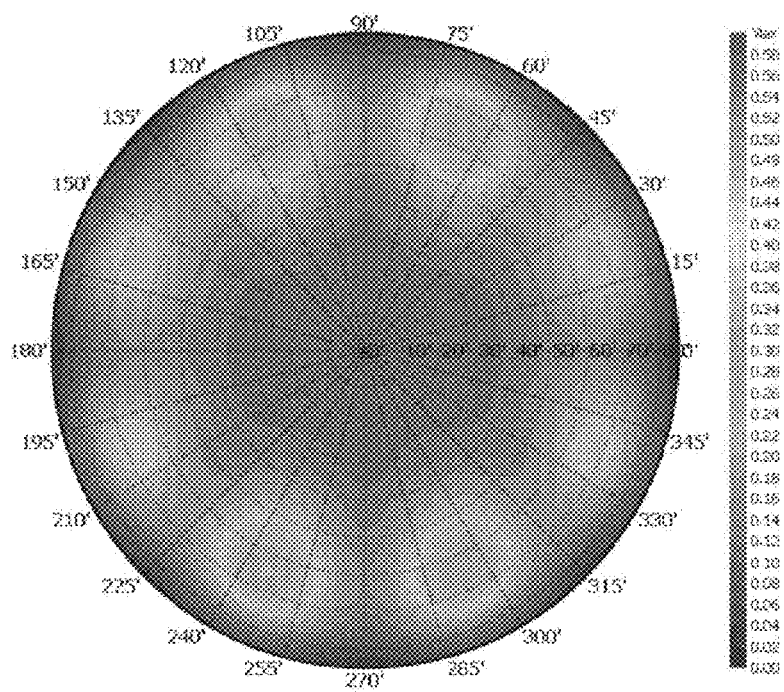
FIG. 9B shows a simulation result of a contrast ratio characteristic of a liquid crystal display apparatus according to various embodiments of the inventive concepts.

FIG. 9A shows a simulation result of a contrast ratio characteristic of a comparison example, and FIG. 9B shows a simulation result of a contrast ratio characteristic of a liquid crystal display apparatus according to a second embodiment of the inventive concepts. The comparison example of FIG. 9A is the same as the comparison example of FIG. 7A. Thus, the descriptions to the comparison example in FIG. 9A are omitted.

FIG. 9B shows a simulation value of a contrast ratio characteristic of the liquid crystal display apparatus according to a second embodiment of the inventive concepts. The liquid crystal display apparatus according to the second embodiment includes the biaxial film having the in-plane retardation value of 145 nm and the thickness retardation value of 60 nm, and the negative C-plate having the thickness retardation value of 210 nm.

According to the contrast ratio of the liquid crystal display apparatus of the second embodiment, the amount of the side light leakage is small at the azimuths of 0 degrees, 50 degrees, 90 degrees, 130 degrees, 230 degrees, 270 degrees and 310 degrees. On the other hand, the amount of the side light leakage is large at the inclination angle of about 65 degrees and the azimuths of 20 degrees, 70 degrees, 160 degrees, 200 degrees, 250 degrees, 290 degrees and 340 degrees. The side light leakage of the second embodiment has a third maximum value at the inclination angle of about 65 degrees and the azimuth of 20 degrees. The second maximum value is 0.325 cd/m$^2$.

However, the third maximum value is markedly lower than the first maximum value. The third maximum value markedly decreases by about 52.4%, as compared with the first maximum value. [(0.68−0.32)/0.68=52.4%]

As described above, the in-plane retardation value and the thickness retardation value of the biaxial film may be optimized such that the phase difference film 801 may have the in-plane retardation value of about 120 nm to about 150 nm, and the in-plane retardation value of about 240 nm to about 300 nm. Thus, the contrast ratio of the liquid crystal display device may be improved. In other words, the polarization state of the light is changed along the polarization path corresponding to the retardation values such that the side light leakage may be markedly inhibited.

According to embodiments of the inventive concepts, the color filer and the thin film transistor are disposed on the array substrate, and the phase difference film having the retardation values is disposed on the opposite substrate. Thus, the light leakage is inhibited. As a result, the contrast ratio of the liquid crystal display apparatus is improved.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A liquid crystal display apparatus comprising:
   a liquid crystal display panel comprising an array substrate comprising a thin film transistor, an opposite substrate facing to the array substrate, and a liquid crystal layer disposed between the array substrate and the opposite substrate, the liquid crystal layer comprising homeotropically aligned liquid crystal molecules;
   a first polarizing plate disposed on an outer surface of the array substrate, the first polarizing plate having a first transmission axis;
   a second polarizing plate disposed on an outer surface of the opposite substrate, the second polarizing plate including a second transmission axis perpendicular to the first transmission axis;
   a phase difference film disposed between the second polarizing plate and the liquid crystal layer, the phase difference film having an in-plane retardation value in a range of about 120 nm to about 150 nm and a thickness retardation value in a range of about 240 nm to about 300 nm; and
   a backlight unit providing light to the first polarizing plate,
   wherein the phase difference film comprises:
     an A-plate; and
     a negative C-plate,
   wherein an in-plane retardation value of the A-plate is in a range of about 120 nm to about 150 nm, and
   wherein a thickness retardation value of the negative C-plate is in a range of about 190 nm to about 210 nm.

2. The liquid crystal display apparatus of claim 1, wherein a thickness retardation value of the A-plate is in a range of about 60 nm to about 75 nm.

3. The liquid crystal display apparatus of claim 1, wherein an in-plane retardation value of the negative C-plate is zero.

4. The liquid crystal display apparatus of claim 1, wherein the A-plate is disposed between the negative C-plate and the second polarizing plate.

5. The liquid crystal display apparatus of claim 1, wherein the negative C-plate is disposed between the A-plate and the second polarizing plate.

6. The liquid crystal display apparatus of claim 1, wherein at least one of the A-plate and the negative C-plate exhibits reverse wavelength dispersion.

7. A liquid crystal display apparatus comprising:
   a liquid crystal display panel comprising an array substrate comprising a thin film transistor, an opposite substrate facing to the array substrate, and a liquid crystal layer disposed between the array substrate and the opposite substrate, the liquid crystal layer comprising homeotropically aligned liquid crystal molecules;
   a first polarizing plate disposed on an outer surface of the array substrate, the first polarizing plate having a first transmission axis;
   a second polarizing plate disposed on an outer surface of the opposite substrate, the second polarizing plate including a second transmission axis perpendicular to the first transmission axis;
   a phase difference film disposed between the second polarizing plate and the liquid crystal layer, the phase difference film having an in-plane retardation value in a range of about 120 nm to about 150 nm and a thickness retardation value in a range of about 240 nm to about 300 nm; and
   a backlight unit providing light to the first polarizing plate,
   wherein the phase difference film comprises:
     a biaxial film; and
     a negative C-plate,
   wherein an in-plane retardation value of the biaxial film is in a range of about 120 nm to about 150 nm, and
   wherein a thickness retardation value of the negative C-plate is in a range of about 190 nm to 210 nm.

8. The liquid crystal display apparatus of claim 7, wherein a thickness retardation value of the biaxial film is in a range of about 60 nm to about 80 nm, and
   wherein an in-plane retardation value of the negative C-plate is zero.

9. The liquid crystal display apparatus of claim 7, wherein the negative C-plate is disposed between the biaxial film and the second polarizing plate.

10. The liquid crystal display apparatus of claim 7, wherein the biaxial film is disposed between the negative C-plate and the second polarizing plate.

11. The liquid crystal display apparatus of claim 7, wherein at least one of the biaxial film and the negative C-plate exhibits reverse wavelength dispersion.

12. The liquid crystal display apparatus of claim 1, wherein the first polarizing plate comprises a zero-retarder.

13. The liquid crystal display apparatus of claim 1, wherein the array substrate further comprises a color filter.

14. The liquid crystal display apparatus of claim 1, wherein the liquid crystal display panel further comprises a black matrix covering the transistor.

15. The liquid crystal display apparatus of claim 14, wherein the liquid crystal display panel further comprises a column spacer disposed between the array substrate and the opposite substrate.

16. The liquid crystal display apparatus of claim 15, wherein the column spacer is opaque.

* * * * *